(12) United States Patent
Matusko et al.

(10) Patent No.: US 10,308,203 B2
(45) Date of Patent: Jun. 4, 2019

(54) STAB PROOF BACK PANEL FOR LAW ENFORCEMENT VEHICLE

(71) Applicant: Ford Global Technologies, LLC, Dearborn, MI (US)

(72) Inventors: Andrew Matusko, Dexter, MI (US); Kevin Mozurkewich, Livonia, MI (US); Spencer Robert Hoernke, Dundas (CA); Johnathan Andrew Line, Northville, MI (US); Moises Abraham Hernandez Soto, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 15/628,293

(22) Filed: Jun. 20, 2017

(65) Prior Publication Data

US 2018/0361977 A1    Dec. 20, 2018

(51) Int. Cl.
| | | |
|---|---|---|
| *B60R 21/12* | (2006.01) | |
| *B60N 2/68* | (2006.01) | |
| *B60N 2/64* | (2006.01) | |
| *B60N 2/60* | (2006.01) | |
| *B60N 2/24* | (2006.01) | |
| *F41H 5/013* | (2006.01) | |
| *B60R 21/00* | (2006.01) | |

(52) U.S. Cl.
CPC ............... *B60R 21/12* (2013.01); *B60N 2/24* (2013.01); *B60N 2/6009* (2013.01); *B60N 2/64* (2013.01); *B60N 2/643* (2013.01); *B60N 2/686* (2013.01); *B60R 2021/0065* (2013.01); *F41H 5/013* (2013.01)

(58) Field of Classification Search
CPC . B60R 21/12; B60R 2021/0065; B60N 2/643; B60N 2/686; B60N 2/64; F41H 5/013
See application file for complete search history.

(56) References Cited

U.S. PATENT DOCUMENTS

| | | | |
|---|---|---|---|
| 5,370,035 A | 12/1994 | Madden, Jr. | |
| 5,441,331 A | 8/1995 | Vento | |
| 5,511,842 A * | 4/1996 | Dillon | B60N 2/24 224/400 |
| 5,951,110 A * | 9/1999 | Conner | A47C 3/12 297/452.31 |
| 6,286,882 B1 * | 9/2001 | Rastetter | B60J 7/223 296/24.41 |
| 6,386,638 B1 * | 5/2002 | Strauch | B60N 2/68 297/452.18 |
| 6,688,700 B2 * | 2/2004 | Gupta | B29C 49/4802 297/232 |

(Continued)

*Primary Examiner* — Philip F Gabler

(74) *Attorney, Agent, or Firm* — Vichit Chea; Price Heneveld LLP

(57) ABSTRACT

A seating assembly includes a seat and a seatback. The seatback is operably coupled with the seat. A back panel is disposed on a backside of the seat and includes a metal insert. An injection molded polymeric panel is formed around the metal insert. The metal insert is retained by the polymeric panel by a ribbon style mechanical lock. Peripheral attachment features are disposed about an outer perimeter of the back panel for securing the back panel with a frame of the seatback.

19 Claims, 7 Drawing Sheets

(56) References Cited

U.S. PATENT DOCUMENTS

| | | | | |
|---|---|---|---|---|
| 6,896,324 B1* | 5/2005 | Kull | ............... | B60N 2/4242 |
| | | | | 297/216.1 |
| 7,250,091 B2* | 7/2007 | Gupta | ............... | B60N 2/686 |
| | | | | 156/242 |
| 7,270,377 B2* | 9/2007 | Schmitz | ............ | A47C 7/425 |
| | | | | 297/230.1 |
| 7,604,298 B2* | 10/2009 | Peterson | ........... | A47C 7/462 |
| | | | | 297/353 |
| 7,731,293 B1* | 6/2010 | Donovan | .......... | B60N 2/686 |
| | | | | 297/452.18 |
| 8,376,456 B2* | 2/2013 | Fujita | ............... | B32B 7/12 |
| | | | | 297/216.1 |
| 8,783,780 B2* | 7/2014 | Hoshi | ............. | B60N 2/0232 |
| | | | | 297/452.18 |
| 8,991,930 B2* | 3/2015 | Laframboise | ...... | B29C 44/12 |
| | | | | 297/440.2 |
| 9,216,674 B1* | 12/2015 | Garib | ............... | B60N 2/441 |
| 2004/0183356 A1* | 9/2004 | Philippot | ........... | B60N 2/70 |
| | | | | 297/452.18 |
| 2010/0251883 A1* | 10/2010 | Naroditsky | ....... | B60N 2/4242 |
| | | | | 89/36.02 |
| 2015/0145303 A1* | 5/2015 | Line | ................. | B60N 2/643 |
| | | | | 297/283.3 |
| 2017/0368960 A1* | 12/2017 | Whitmore | ........... | B60N 2/56 |

* cited by examiner

STAB PROOF BACK PANEL FOR LAW ENFORCEMENT VEHICLE

FIELD OF THE DISCLOSURE

The present disclosure generally relates to a back panel for a vehicle, and more particularly to a stab proof back panel for a law enforcement vehicle.

BACKGROUND OF THE DISCLOSURE

Special accommodations are generally provided in vehicles of law enforcement agents. Oftentimes, the interior and exterior of the vehicles are strengthened to accommodate the aggressive behavior of some occupants, and also to protect the law enforcement agent. One such area of a vehicle that is made more robust may be the seatbacks of the front seats. The seatbacks may be strengthened or otherwise thickened to minimize the likelihood that an incarcerated individual in the back seat could stab or otherwise cause harm to a law enforcement agent in the front seat.

SUMMARY OF THE DISCLOSURE

According to one aspect of the present disclosure, a seating assembly includes a seat and a seatback. The seatback is operably coupled with the seat. A back panel is disposed on a backside of the seat and includes a metal insert. An injection molded polymeric panel is formed around the metal insert. The metal insert is retained by the polymeric panel by a ribbon style mechanical lock. Peripheral attachment features are disposed about an outer perimeter of the back panel for securing the back panel with a frame of the seatback.

According to another aspect of the present disclosure, a seatback for a seating assembly includes a cushion and a back panel. The back panel includes a stab proof insert. An injection molded polymeric panel is formed around the stab proof insert. The stab proof insert is retained by the polymeric panel by a ribbon style mechanical lock. Peripheral attachment features are disposed about an outer perimeter of the back panel for securing the back panel with a frame of the seatback.

According to yet another aspect of the present disclosure, a vehicle seating assembly includes a seatback. A back panel is disposed on a backside of a seat and includes a stab proof insert. An injection molded polymeric panel is formed around the stab proof insert. The stab proof insert is retained by the polymeric panel by a ribbon style mechanical lock. Peripheral attachment features are disposed about an outer perimeter of the back panel for securing the back panel with a frame of the seatback. A recess is defined in an external surface of the back panel. The stab proof insert includes an indent that is complementary in size and shape to the recess.

Embodiments of the first aspect, the second aspect, and the third aspect of the present disclosure, as set forth in the preceding paragraphs, can include any one or a combination of the following features:
  A lower shroud is operably coupled with a lower extension of a back panel.
  A plurality of formed windows are disposed on an internal surface of the back panel.
  The plurality of formed windows expose a metal insert.
  Inner attachment features are disposed above and below the plurality of formed windows.
  A recess is defined in an external surface of the back panel.
  The metal insert includes an indent that is complementary in size and shape to the recess.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1A:
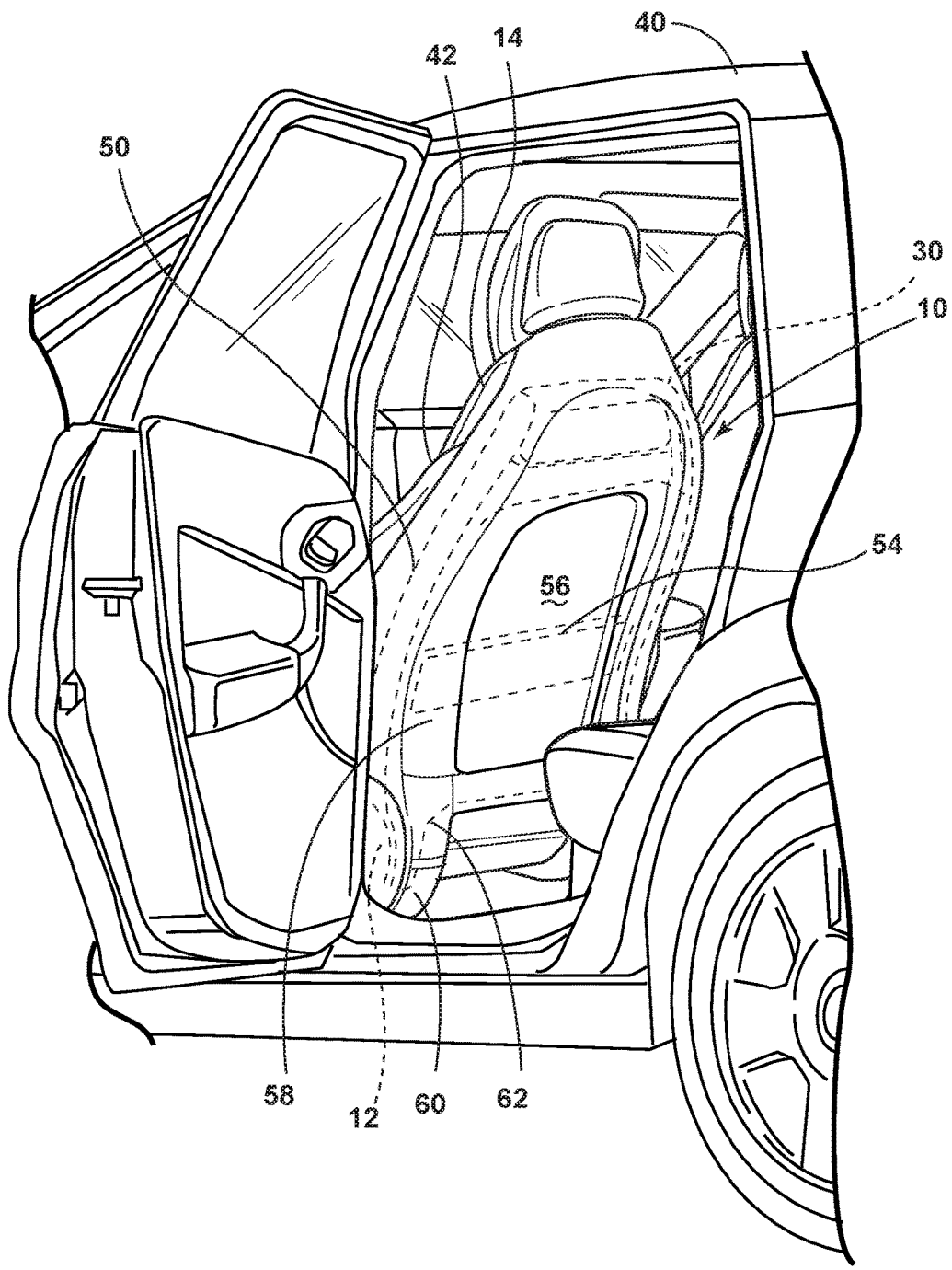
FIG. 1A is a rear perspective view of a seating assembly of the present disclosure.
Figure 1B:
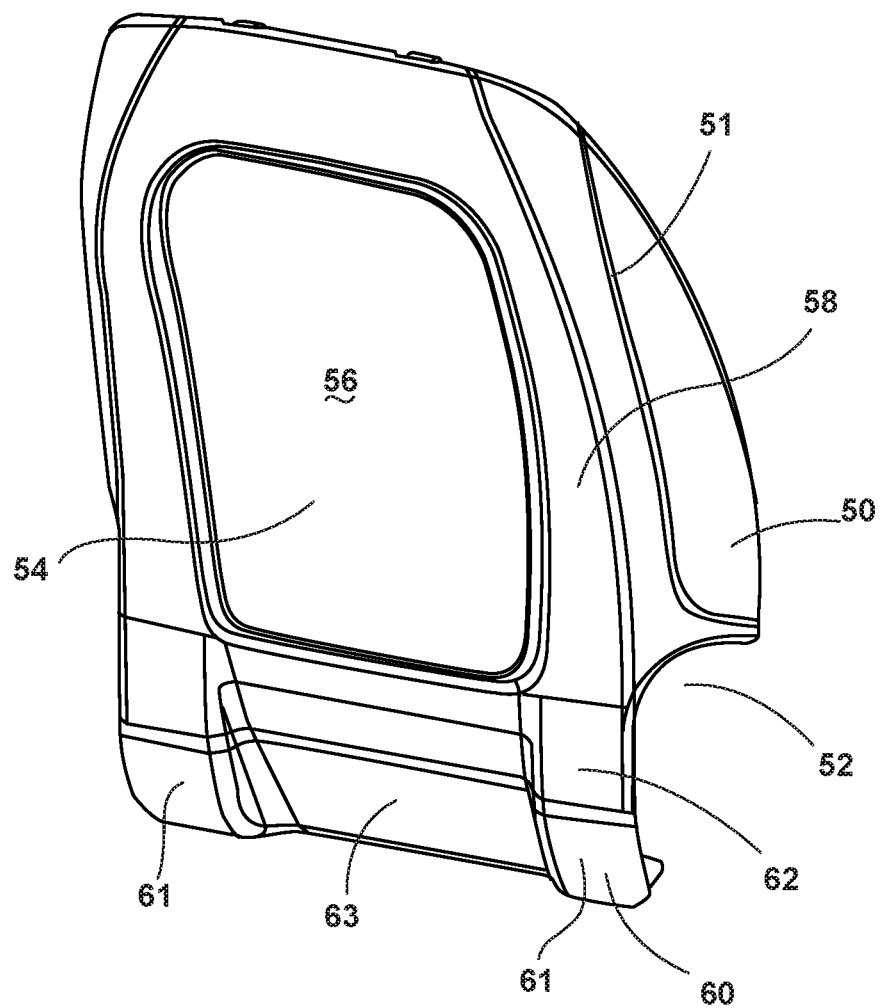
FIG. 1B is a rear perspective view of a back panel for installation on a seatback of a seating assembly of the present disclosure.

For purposes of description herein, the terms "upper," "lower," "right," "left," "rear," "front," "vertical," "horizontal," and derivatives thereof shall relate to the disclosure as oriented in FIG. 1A. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1A-6, reference numeral 10 generally designates a seating assembly that includes a seat 12 and a seatback 14. The seatback 14 is operably coupled with the seat 12. A back panel 16 is disposed on a backside 18 of the seatback 14 and includes a stab proof insert 20. An injection molded polymeric panel 22 is formed around the stab proof insert 20. The stab proof insert 20 is retained by the polymeric panel 22 by a ribbon style mechanical lock 24. Peripheral attachment features 26 are disposed about an outer perimeter 28 of the back panel 16 for securing the back panel 16 with a frame 30 of the seatback 14.

With reference again to FIGS. 1A and 1B, the illustrated seating assembly 10 is generally configured for use within a vehicle 40, such as a car, truck, van, etc. However, it will be noted that the seating assembly 10 could be used in other applications outside of the automotive industry. The seatback 14 is generally rotatably coupled with the seat 12. This configuration allows for reclining of the seatback 14 relative to the seat 12. The seatback 14 includes a coverstock 42 that is configured to extend over a cushion assembly. The cushion assembly rests on a carrier, which is supported on the frame 30 of the seatback 14. The back panel 16 extends behind the frame 30, and in a law enforcement setting, is constructed to be more robust than a traditional back panel utilized in vehicles regularly purchased by everyday consumers. The back panel 16 includes side extensions 50 that are generally configured to extend over sides of the frame 30, and possibly to conceal side airbags disposed proximate the frame 30. Each of the side extensions 50 may include a living hinge 51 configured to allow rotation of the side extensions 50 outward, thereby allowing deployment of side airbags in the event of a vehicle collision. Lower arcuate slots 52 are defined on each side of the back panel 16 and are configured to accommodate portions of a recliner assembly of the seat 12. A central portion 54 of the back panel 16 includes a recess 56. The recess 56 is defined in an external surface 58 of the back panel 16. A lower shroud 60 is disposed below the back panel 16 and is operably coupled with a lower extension 62 of the back panel 16. The lower shroud 60 may include outer bulbous portions 61 configured to accommodate a lower seat frame. The lower shroud 60 may also include a central indent 63 configured to give additional space to a passenger seated in a rear seat.

Figure 2:
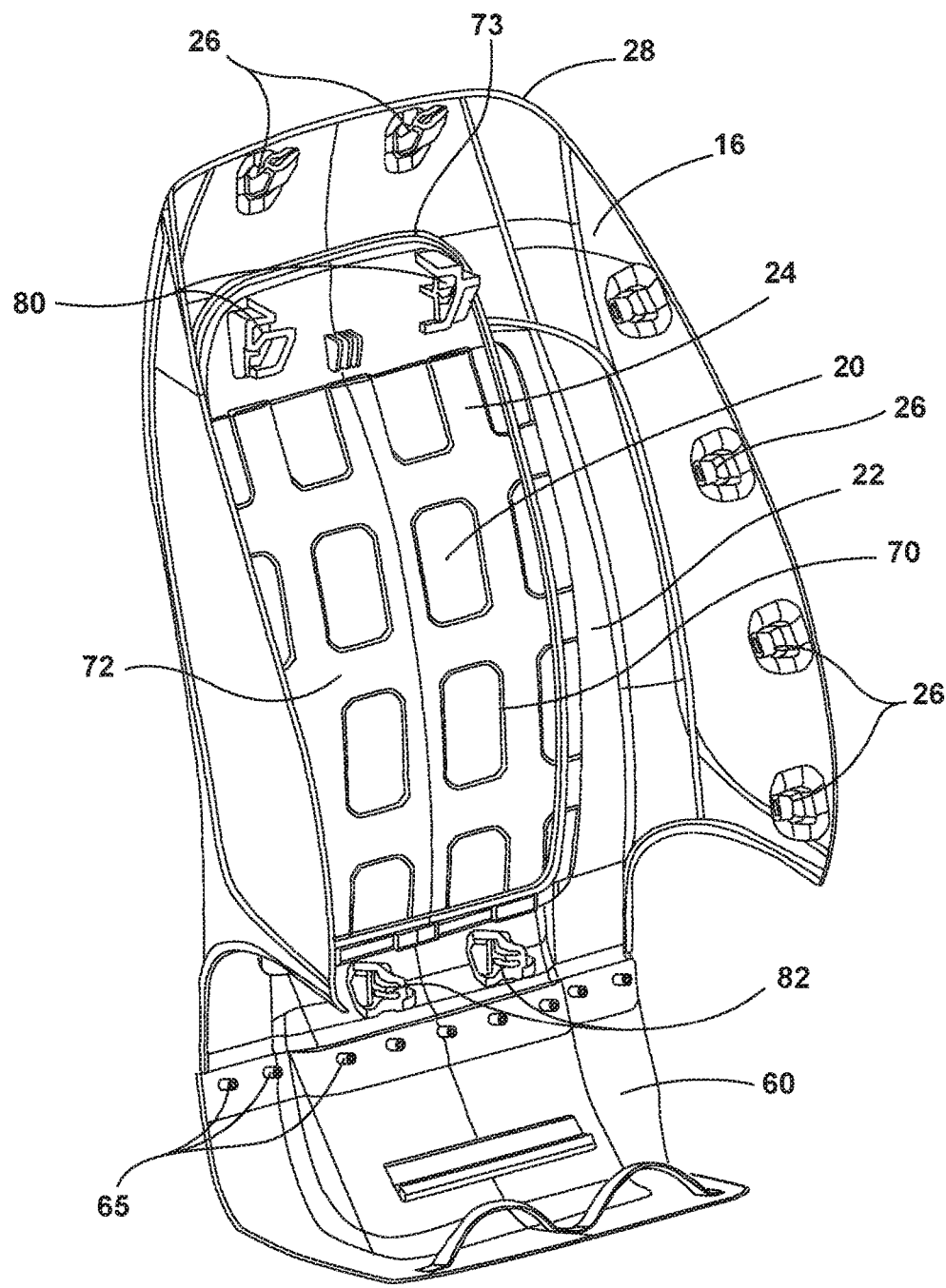
FIG. 2 is a front perspective view of a back panel for a seating assembly of the present disclosure.
Figure 3:
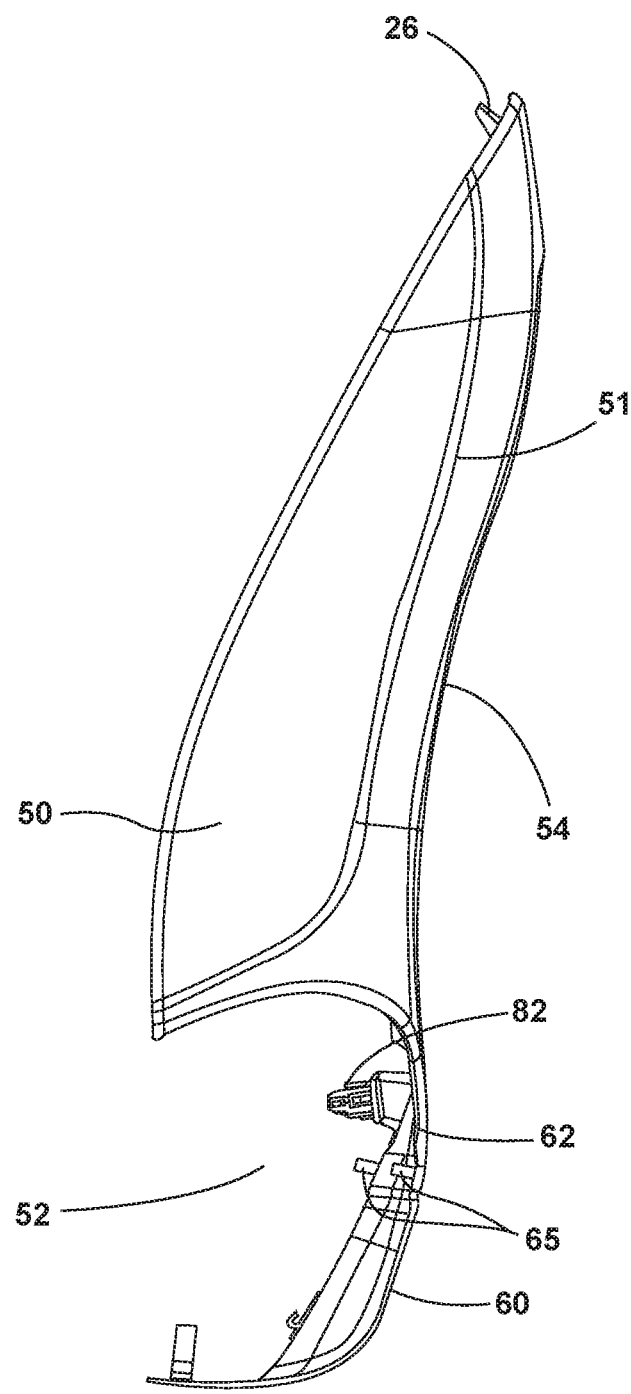
FIG. 3 is a side perspective view of a back panel for a seating assembly of the present disclosure.

As illustrated in FIG. 2, the lower shroud 60 may be operably coupled with the lower extension 62 via heat stakes 65. However, it is also contemplated that the lower shroud 60 may be operably coupled with the lower extension 62 in a variety of other manners, including adhesive, welding, mechanical fasteners, etc. The lower shroud 60 extends downward and inward under the seat. The lower shroud 60 extends below lower inner attachment features and has an arcuate construction. The lower shroud 60 is configured to extend downward below the seat 12 to prevent a passenger from reaching forward under the seat 12, compromising the safety of a law enforcement agent sitting in the front seat.

With reference again to FIGS. 2 and 3, an internal surface 72 of the back panel 16 includes an inner support 68 in the form of mechanical lock ribbons that extend horizontally and vertically to define a plurality of formed windows 70. The stab proof insert 20 is readily visible from the internal surface 72 of the back panel 16 through the plurality of formed windows 70. In addition, a peripheral joint 73 of the recess 56 formed in the back panel 16 is also generally visible from the internal surface 72 of the back panel 16. The peripheral attachment features 26 extend about the periphery of the back panel 16 and are configured to attach with one or both of the frame 30 and a front closeout panel of the seating assembly 10. It will be understood that the peripheral attachment features 26 may include an interference fit, a mechanical interlock, a snap-fit engagement, etc., to clearly secure the back panel 16 with the seatback 14. A molded pocket 74 is generally defined between the inner support 68 and the internal surface 72 of the back panel 16.

The internal surface 72 of the back panel 16 also includes a plurality of inner attachment features 80, 82. The upper inner attachment features 80 are disposed within a periphery of the recess 56 and are configured to engage a portion of the frame 30 or connecting features disposed on a carrier positioned on the frame 30. The lower inner attachment features 82 are configured to engage a lower portion of the frame 30 or a portion of the carrier. The back panel 16 generally conceals the inner framework and inner working components of the seatback 14. The back panel 16 is generally constructed the same for civilian use and law enforcement use, but with some robust modifications for law enforcement use. Thus, the back panel 16 can be made with the same processes for each application. It will be understood that the mechanical lock ribbons 68 that generally define the plurality of formed windows 70 may be of a variety of thicknesses and lengths, resulting in different sized windows. In addition, it will be generally understood that because the stab proof insert 20 is stamped and then overmolded to define the back panel 16, a wide variety of shapes and constructions may be considered that are otherwise not available when the stab proof inserts 20 are sewn into the back panel 16 constructions.

Figure 4:
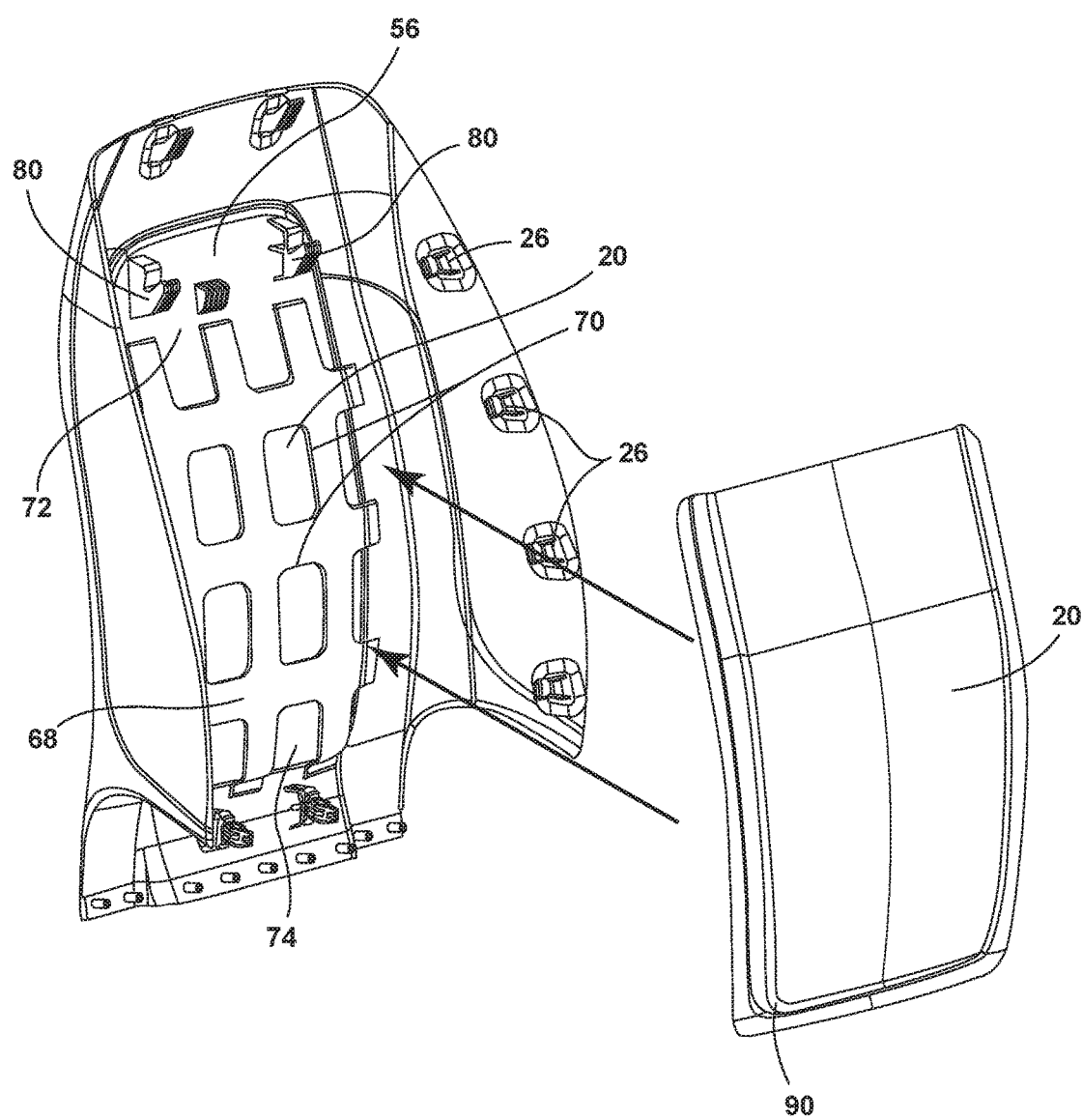
FIG. 4 is a front perspective view of a back panel for a seating assembly of the present disclosure with a stab proof insert removed.
Figure 5:
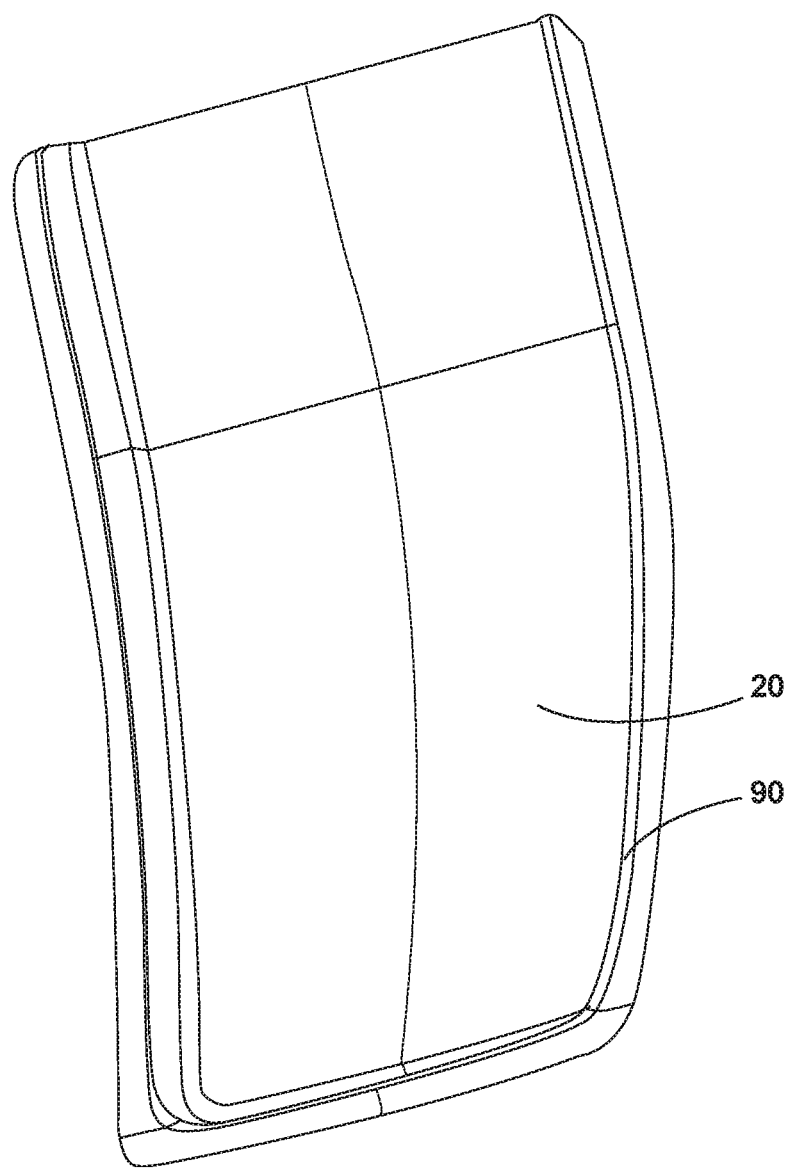
FIG. 5 is a front perspective view of the stab proof insert of FIG. 4.

With reference now to FIGS. 4 and 5, the stab proof insert 20 may be constructed from a variety of materials, including hardened polymeric materials, metal, etc., that are configured to withstand the thrust force of an individual with a stabbing weapon seated in the back seat of the vehicle 40. Traditional stab proofing methods oftentimes include sewing a pocket into an envelope seat cover back and sliding a stamped steel panel into the pocket for retention. The method and constructions of this disclosure contemplate a stab proof insert 20 that is a steel panel stamped in the form of a profile of the seatback 14. This construction provides a thinner and more sleek profile than traditional back panels and provides enhanced stab proof capabilities without compromising styling or performance of the functionality of the seatback 14. The formed panel (whether injection molded or otherwise formed polymeric, or stamped metal) is then overmolded through the ribbon style mechanical lock 24 to positively retain the stab proof insert 20 within the back panel 16. This method eliminates additional components being required on the trim cover, and also eliminates any secondary operations that would otherwise be required at the assembly plant when the seating assembly 10 is constructed. Consequently, the back panel 16 may be installed in the same manner whether the back panel 16 includes the stab proof insert 20 or not, resulting in minimal assembly complexity during the manufacturing process.

Figure 6:
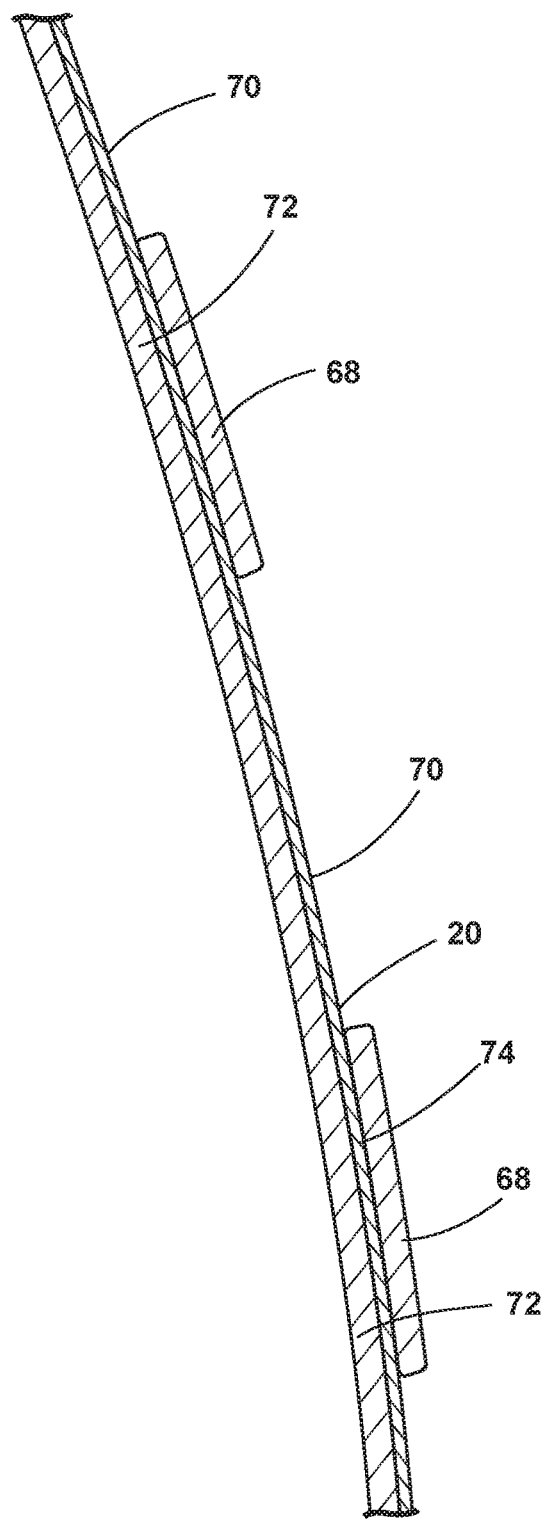
FIG. 6 is a partial side elevational cross-sectional view of a back panel of a seating assembly of the present disclosure.

With reference to FIG. 6, the stab proof insert 20 is generally not visible from the external surface 58 of the seatback 14. However, the stab proof insert 20 is visible through the plurality of windows 70 disposed on the internal surface 72 of the back panel 16. In the event the stab proof insert 20 is not required and the vehicle 40 will not be used for law enforcement purposes, the stab proof insert 20 can simply be omitted from the manufacturing process. In this instance, the back panel 16 is otherwise the same in construction, but simply lacks the stab proof insert 20. As shown in FIG. 4, the plurality of inner attachment features 80, 82 are disposed both above and below the plurality of formed windows 70. Additionally, it will be generally understood that the stab proof insert 20 includes an indent 90 that is complementary in size and shape to the recess 56 of the back panel 16.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A seating assembly comprising:
   a seat;
   a seatback, the seatback being operably coupled with the seat; and
   a back panel disposed on a backside of the seat and comprising:
      a metal insert;
      an injection molded polymeric panel formed around the metal insert, wherein the metal insert is retained by the polymeric panel by mechanical lock ribbons that extend horizontally and vertically to define a plurality of windows; and
      peripheral attachment features disposed about an outer perimeter of the back panel for securing the back panel with a frame of the seatback.

2. The seating assembly of claim 1, further comprising:
   a lower shroud operably coupled with a lower extension of the back panel.

3. The seating assembly of claim 1, further comprising:
   a plurality of formed windows disposed on an internal surface of the back panel.

4. The seating assembly of claim 3, wherein the plurality of formed windows expose the metal insert.

5. The seating assembly of claim 3, wherein inner attachment features are disposed above and below the plurality of formed windows.

6. The seating assembly of claim 1, further comprising:
   a recess defined in an external surface of the back panel.

7. The seating assembly of claim 6, wherein the metal insert includes an indent that is complementary in size and shape to the recess.

8. A seatback for a seating assembly, the seatback including a cushion and a back panel, the back panel comprising:
   a stab proof insert;
   an injection molded polymeric panel having intersecting ribbons defining windows and retaining the stab proof insert; and
   peripheral attachment features disposed about an outer perimeter of the back panel for securing the back panel with a frame of the seatback.

9. The seatback of claim 8, further comprising:
   a lower shroud operably coupled with a lower extension of the back panel.

10. The seatback of claim 8, further comprising:
    a plurality of formed windows disposed on an internal surface of the back panel.

11. The seatback of claim 10, wherein the plurality of formed windows expose the stab proof insert.

12. The seatback of claim 10, wherein inner attachment features are disposed above and below the plurality of formed windows.

13. The seatback of claim 8, further comprising:
    a recess defined in an external surface of the back panel.

14. The seatback of claim 13, wherein the stab proof insert includes an indent that is complementary in size and shape to the recess.

15. A vehicle seating assembly comprising:
    a seatback;
    a back panel disposed on a backside of a seat and comprising:
       a stab proof insert;
       an injection molded polymeric panel that includes mechanical lock ribbons that define windows, the polymeric panel configured to retain the stab proof insert;
       peripheral attachment features disposed about an outer perimeter of the back panel for securing the back panel with a frame of the seatback; and
       a recess defined in an external surface of the back panel, wherein the stab proof insert includes an indent that is complementary in size and shape to the recess.

16. The vehicle seating assembly of claim 15, further comprising:
    a lower shroud operably coupled with a lower extension of the back panel.

17. The vehicle seating assembly of claim 15, further comprising:
   a plurality of formed windows disposed on an internal surface of the back panel.

18. The vehicle seating assembly of claim 17, wherein the plurality of formed windows expose the stab proof insert.

19. The vehicle seating assembly of claim 17, wherein inner attachment features are disposed above and below the plurality of formed windows.

* * * * *